US006332983B1

(12) United States Patent
Tashiro et al.

(10) Patent No.: US 6,332,983 B1
(45) Date of Patent: Dec. 25, 2001

(54) CHIP TREATMENT DEVICE

(75) Inventors: Minoru Tashiro; Makoto Tashiro, both of Tokyo (JP)

(73) Assignee: Bunri Industries, Ltd., Kitamorokata-gun (JP)

( * ) Notice: Subject to any disclaimer, the term of this patent is extended or adjusted under 35 U.S.C. 154(b) by 0 days.

(21) Appl. No.: 09/565,488

(22) Filed: May 5, 2000

(30) Foreign Application Priority Data

May 10, 1999 (JP) .................... 11-129098
Jul. 12, 1999 (JP) .................... 11-197483
Oct. 22, 1999 (JP) .................... 11-300469

(51) Int. Cl.[7] .................... B23Q 11/00; B01D 36/04; B01D 36/02

(52) U.S. Cl. .................... 210/297; 210/295; 210/298; 210/323.1; 210/336; 210/320; 210/402; 210/413

(58) Field of Search .................... 210/295, 298, 210/402, 323.1, 335, 320, 297, 168, 413, 336

(56) References Cited

U.S. PATENT DOCUMENTS

Re. 32,135 * 5/1986 Creps et al. .
2,861,688 * 11/1958 Harms .
2,865,509 * 12/1958 Harlan .
4,396,506 * 8/1983 Damerau .
4,735,730 * 4/1988 Bratten .
5,217,613 * 6/1993 Tashiro et al. .
5,858,218 * 1/1999 Setlock et al. .
5,961,847 * 10/1999 Creps et al. .

FOREIGN PATENT DOCUMENTS

189171 * 7/1986 (EP) .
2-070606 (A) * 3/1990 (JP) .
5-031645 (A) * 2/1993 (JP) .
9-150342(A) * 6/1997 (JP) .
11-033870 (A) * 2/1999 (JP) .

OTHER PUBLICATIONS

Patent Abstracts of Japan, 08085981 A, Apr. 2, 1996 Abstract .

* cited by examiner

*Primary Examiner*—Thomas M. Lithgow
(74) *Attorney, Agent, or Firm*—Armstrong, Westerman, Hattori, McLeland & Naughton, LLP

(57) ABSTRACT

A chip treatment device 100 includes a box-shaped housing 110, and an upper surface panel 112 of the housing is connected to a sloped portion 114. The interiors of the housing 110 is divided into upper and lower areas by a partition panel 130, and to the areas are provided a first cutting fluid bath 150 and a second cutting fluid bath 160. Chains 240 stretched between driving sprockets 210 and chain guide units 230 are equipped with scraper units 250 moving in the direction of the arrow. The chips coming in from an entrance opening 180 is separated from cutting fluid while being conveyed on the separation panel 130. First and second filter units 170, 300 filter said cutting fluid.

10 Claims, 17 Drawing Sheets

100 A 138 210 200 240 114 250 240 136 118 A 180 B 150 112 174 C 172 170 D 117 230 110 300 220 119 134 B 116 132 C 160 130 D 124
120
240
245
240
245
242
242
250
250
280
280
170
174
260
260
160
172
242
242

122
240
245
130
240
245

100A
200
210
118
400
138
240
136
117
300
114
250
130
500
A
160
132
112
116
150
134
180
119
230
110
220

CHIP TREATMENT DEVICE

FIELD OF THE INVENTION

The present invention relates to a device for treating the swarf (so-called chips) discharged from machine tools, and more specifically, to a device for conveying the chips, removing from and filtering the cutting fluid contained in the chips, and collecting the fluid.

DESCRIPTION OF THE RELATED ART

FIG. 26 is an explanatory view showing the outline of a chip treatment device according to the prior art.

The chip treatment device denoted as a whole by reference number 1 comprises a box-shaped housing 10 arranged in a horizontal orientation, and a sloped portion 20 rising up slantwise from one end of the housing 10.

On the other end of the housing 10 opposite to the sloped portion 20 is formed a chip entrance 14 for receiving the chips discharged from the machine tool.

A chip discharge opening 22 is provided to the upper area of the sloped portion 20, through which the chips separated from soluble or oleaginous cutting fluid are discharged.

A drive shaft 42 supported by both side walls of the sloped portion 20 is mounted near the upper end of the sloped portion 20, and the drive shaft 42 is equipped with a pair of sprockets 40.

On the other hand, a shaft 46 is equipped near the chip entrance 14 of the housing 10, and a pair of driven sprockets 44 are supported by the shaft 46.

Plate-like chain guides are equipped to both side walls of the housing 10 and the sloped portion 20, which guide the pair of chains 30 along a route shown in the drawing.

A plural number of scrapers 34 are mounted to the chains with appropriate intervals, which act to convey the chips.

The drive shaft 42 drives the chains 30 via the drive sprockets 40 in the direction of arrow A.

The chips $C_1$ provided through the chip entrance 14 are pushed by scrapers 34 on the chains 30, and travels along the bottom surface of the housing 10 and reaches the sloped portion 20. When the chips rise along the sloped portion 20, the cutting fluid contained in the chips are separated from the chips, and collected in a tank 12 inside the housing 10. The cutting fluid inside the tank 12 is sent outside through an appropriate filter unit, and provided to the machine tool again by use of a pump.

Recently, the works to be processed by the machine tool are made of a wide range of materials, including ferric materials and aluminum alloy. This causes the chips generated during the process to be of various shapes, such as long strip-shaped pieces or very fine pieces.

Especially, strip-shaped chips are generated from aluminum-system materials, and they are complexly intertwined when being discharged from the machine tool.

These strip-shaped chips conveyed from the machine tool cause chips $C_3$ to be caught in the discharge opening formed to the upper area of the sloped portion. Further, the strip-shaped chips may be caught in the scrapers 34, and instead of falling from the discharge opening, they return towards the entrance 14, and tangle with the chips introduced from the opening 14, forming a ball-like chip $C_2$ and blocking the conveyance passage.

The present invention relates to a chip treatment device that solves the problems mentioned above.

SUMMARY OF THE INVENTION

The chip treatment device according to the present invention comprises a box-shaped housing, an entrance opening formed to one end of the housing for introducing the chips, a discharge opening formed to the other end of the housing for discharging the chips, driven chain guide units provided under the entrance opening, driving sprockets equipped above the discharge opening for driving chains, a pair of chains each stretched between the driving sprocket and the driven chain guide unit, one or more scraper units mounted to the chains, and a partition panel extending between the driven chain guide unit and the driving sprocket, wherein the scraper units convey the chips along the upper surface of the partition panel.

Moreover, the chip treatment device comprises a first cutting fluid bath formed above the partition panel, a second cutting fluid bath formed under the partition panel, and a first filter unit equipped within the first cutting fluid bath.

Further, a first filter unit is mounted above the first cutting fluid bath, and a filter element of the filter unit is cleaned by the scraper unit. In another example, the chip treatment device is equipped with a passage for guiding the cutting fluid filtered by the first filter unit to a second cutting fluid bath, and a second filter unit, mounted within the second cutting fluid bath.

In yet another example, the scraper units are mounted to scraper units for conveying the chips, and are equipped with cleaning means for cleaning the filter element of the first filter unit.

DETAILED DESCRIPTION OF PREFERRED EMBODIMENTS

Figure 1:
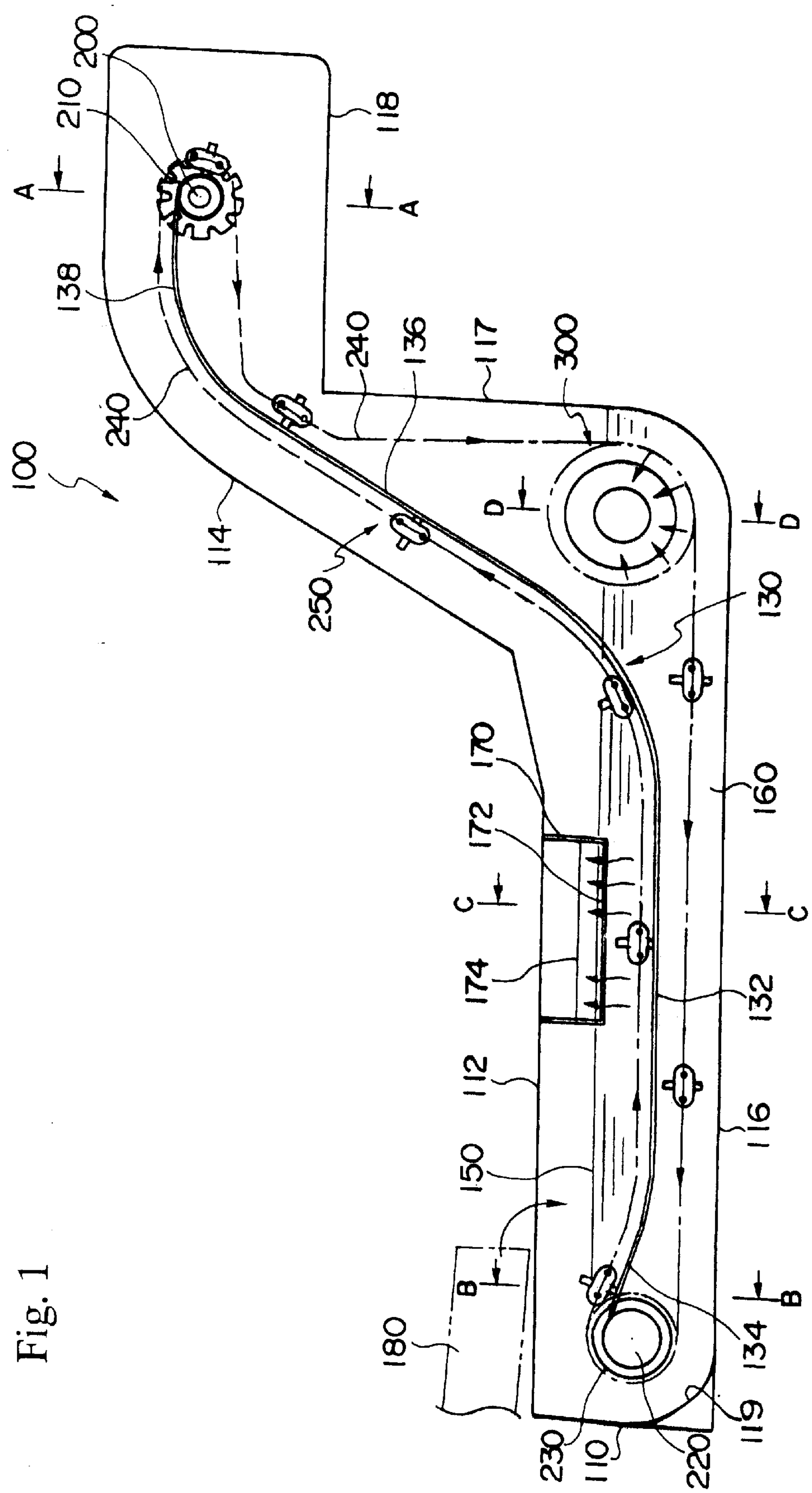
FIG. 1 is a cross-sectional side view of the chip treatment device according to the present invention.
Figure 2:
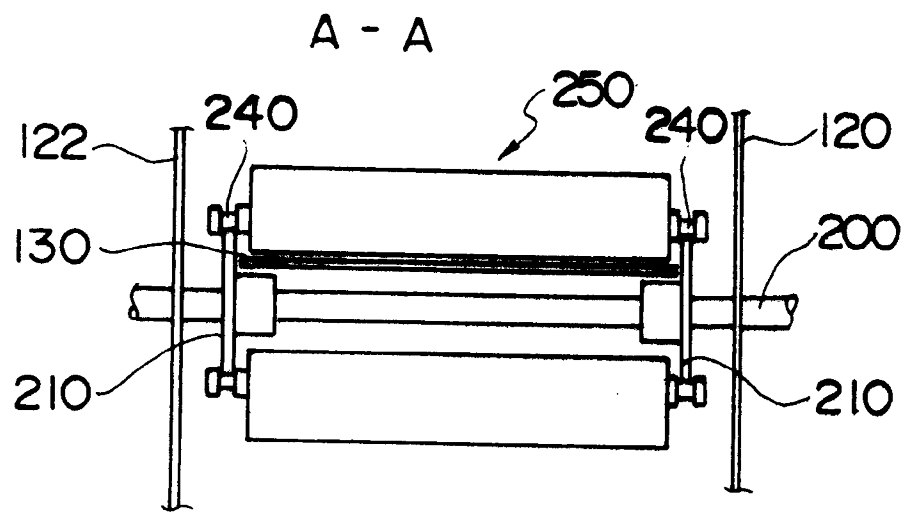
FIG. 2 is an A—A cross-sectional view of FIG. 1.
Figure 3:
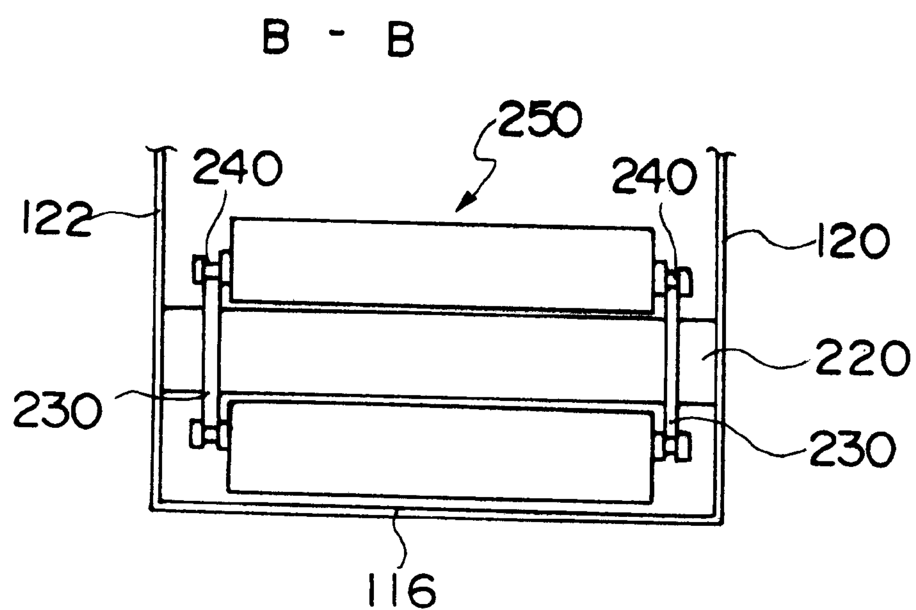
FIG. 3 is a B—B cross-sectional view of FIG. 1.
Figure 4:
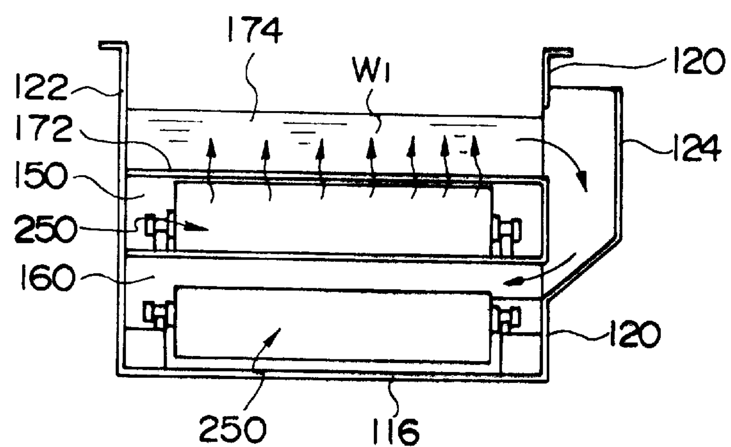
FIG. 4 is a C—C cross-sectional view of FIG. 1.
Figure 5:
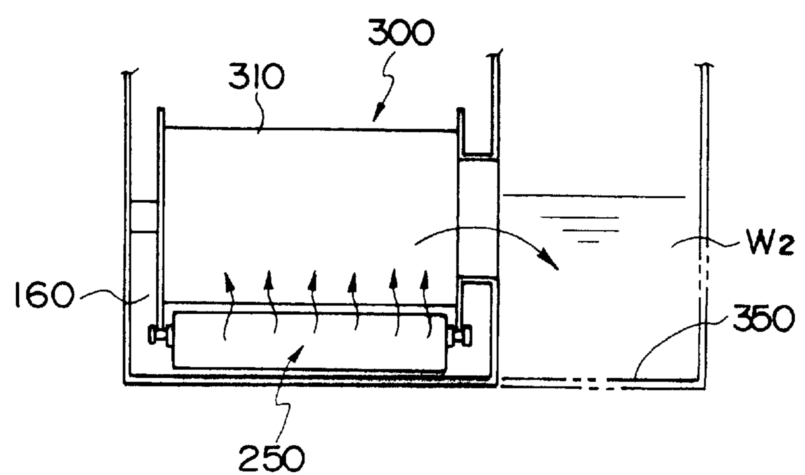
FIG. 5 is a D—D cross-sectional view of FIG. 1.

FIG. 1 is a cross-sectional side view of the chip treatment device according to the present invention, FIG. 2 is an A—A cross-sectional view of FIG. 1, FIG. 3 is a B—B cross-sectional view of FIG. 1, FIG. 4 is a C—C cross-sectional view of FIG. 1, and FIG. 5 is a D—D cross-sectional view of FIG. 1.

The chip treatment device denoted as a whole by reference number 100 includes a housing 110 also functioning as a rectangular tank, and a sloped portion 114 in which the upper surface panel 112 of the housing 110 rises slantwise in the upper direction.

The housing 110 constitutes a tank surrounded by an upper surface panel 112, a lower surface panel 116, both side surface panels 120 and 122.

The lower surface panel 116 opposing the sloped portion 114 of the housing 110 is connected via a vertical surface panel 117 to a discharge exit 118 for discharging the chips. On the other hand, an opening is formed to the upper surface panel 112 near the end of the housing opposite to the sloped portion 114. The opening functions as a chip entrance for receiving the chips transmitted from a machine tool through a chip discharge device 180.

A drive shaft 200 is rotatably fixed near the chip discharge exit, and a pair of sprockets 210 are mounted to the drive shaft 200. On the other hand, a pair of chain guide units 230 is mounted to a driven shaft 220 near the chip entrance. The chain guide units 230 may either utilize a driven sprocket or comprise a disk-shaped fixed chain guide.

A pair of chains is stretched between the driving sprockets 210 and the chain guide units 230. The chains are driven toward the direction of the arrow along a trajectory shown in FIG. 1 by appropriate chain guide means that are mounted to side surface panels 120 and 122.

The device for treating chips according to the present invention further comprises a partition panel 130 that is connected to both the driven chain guide units 230 and the chain driving sprockets 210 inside the housing 110. The partition panel 130 comprises a horizontal portion 132, a first sloped portion 134 which rises up from the horizontal portion 132 towards the chain guide unit 230, a second sloped portion 136 which rises up roughly parallel to the sloped portion 114 formed to the upper panel of the housing, and a chip discharge end 138 in which the second sloped portion 136 is bent to the horizontal direction and reaches above the drive shaft 200.

According to the structure of the present invention, the partition panel 130 divides the space within the housing 110 into an upper sp ace and a lower space.

The partition panel 130 defines a first cutting fluid bath 150 by the first sloped portion 134 that curves downward towards the advancing direction of the chain, the second sloped portion 136 and two side panels 120, 122. The partition panel 130, the lower surface panel 116 and two side panels 120, 122 define a second cutting fluid bath 160.

A first filter unit 170 is mounted to the upper portion of the first cutting fluid bath 150. A second filter unit 300 is mounted to the interior of the second cutting fluid bath 160.

Scraper unit s 250 are mounted to the chain 240 with appropriate pitch intervals.

Figure 6:
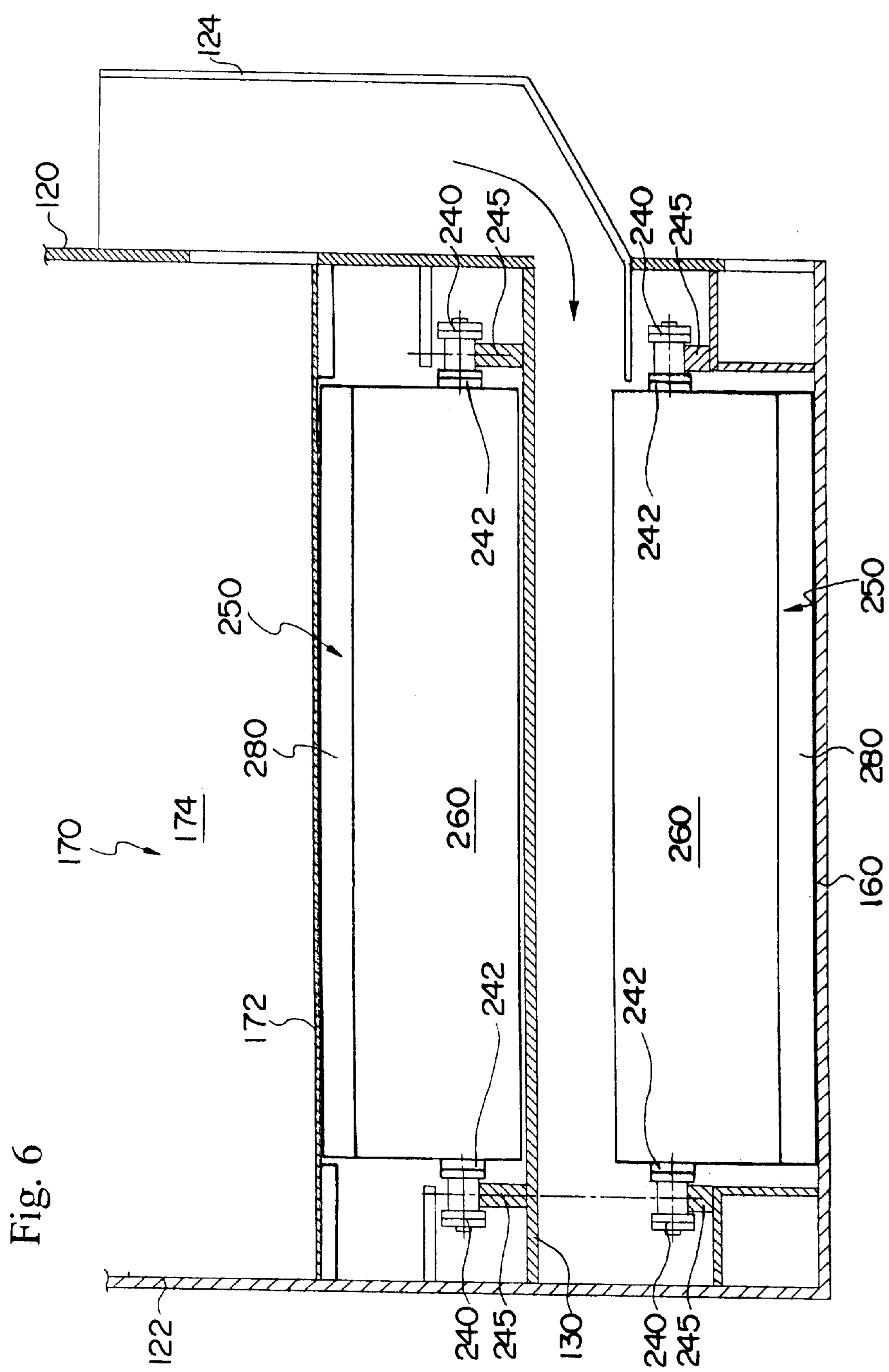
FIG. 6 is an explanatory view of FIG. 4.
Figure 7:
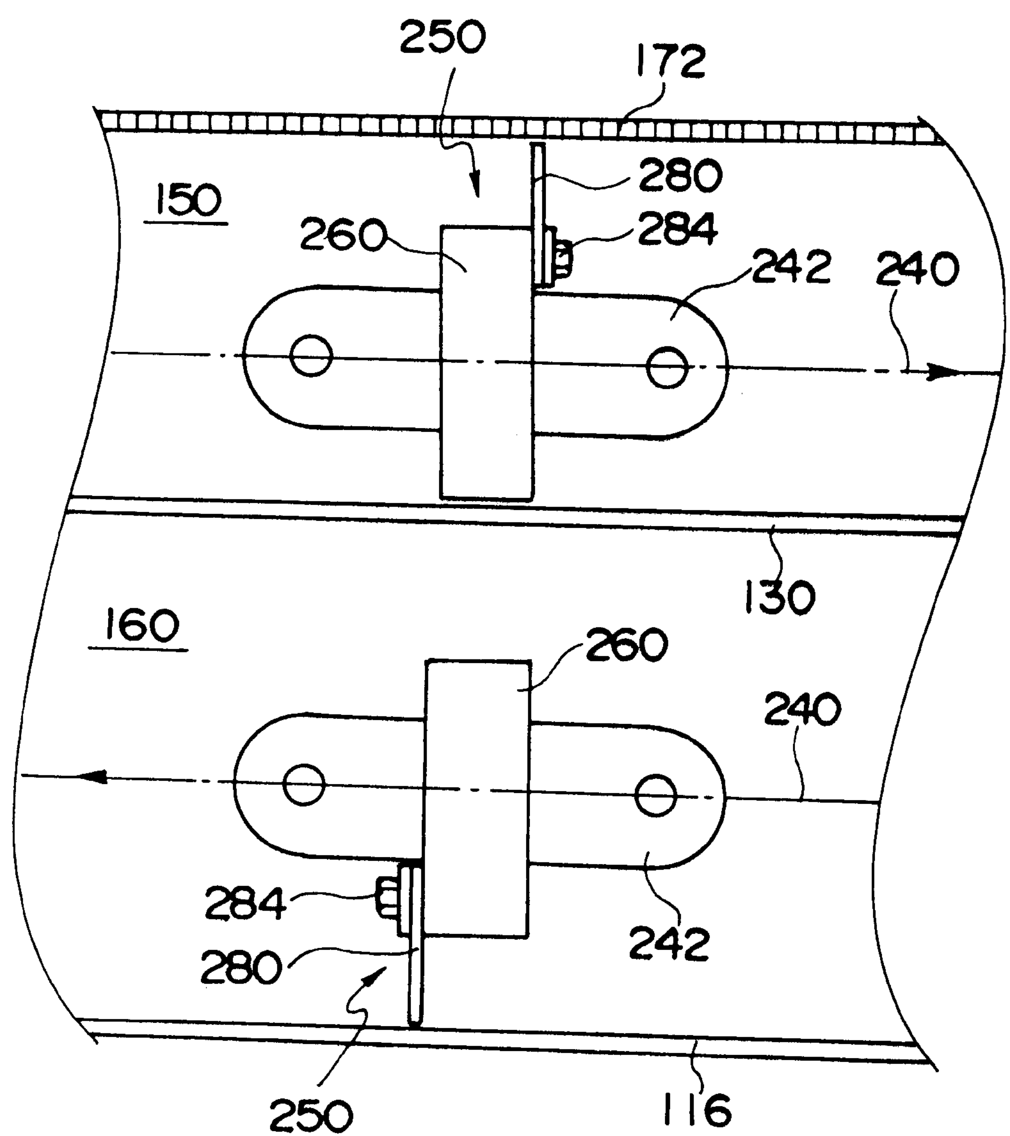
FIG. 7 is a side view of the scraper unit.
Figure 8:
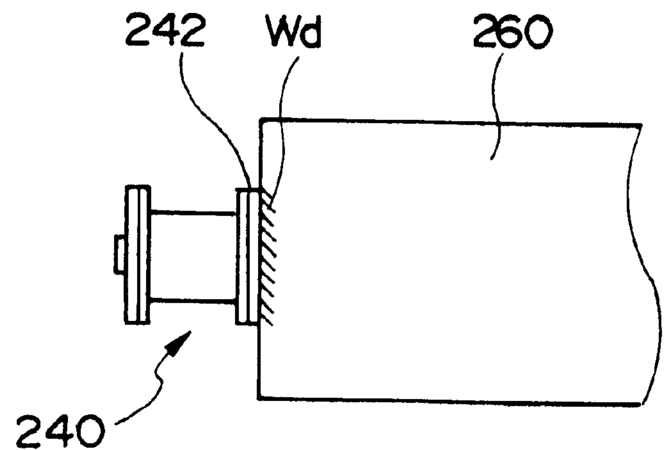
FIG. 8 is an explanatory view showing the mounting structure of the scraper.
Figure 9:
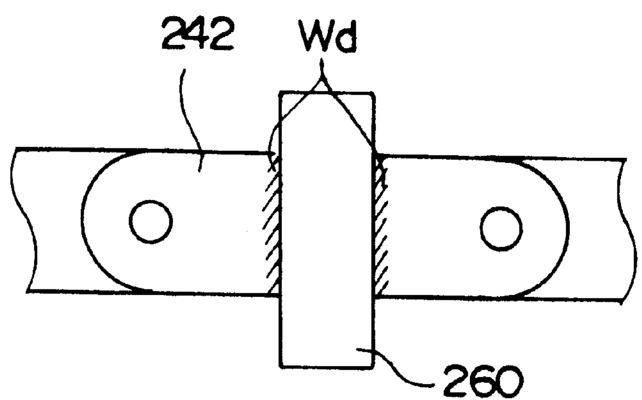
FIG. 9 is an explanatory view showing the mounting structure of the scraper.
Figure 10:
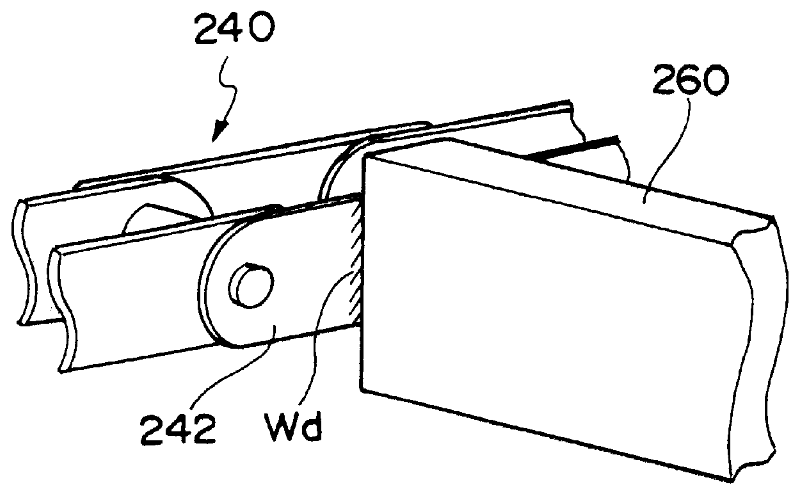
FIG. 10 is an explanatory view showing the mounting structure of the scraper.

FIG. 6 is a front view showing the whole structure of the scraper unit 250, FIG. 7 is a side view thereof, and FIGS. 8, 9 and 10 are explanatory views showing the main portions of the scraper unit.

As shown in FIG. 6, the chain 240 is guided by and moves along a chain guide 245 mounted to the partition plate 130 and components inside the housing.

The scraper unit, shown as a whole by reference number 250, is formed by directly fixing a scraper 260 to a link plate 242 constituting the chain 240. Actually, the scraper 260 is fixed to the link plate 242 by a welding process Wd.

According to the above-mentioned structure, the curled chips conveyed by the scraper 260 will not be caught in the scraper or any other components in the housing, thereby solving the problems caused by chips twining around components in the housing.

Further, the cross-sectional shape of the scraper may be chosen from any appropriate shape, such as rectangular, circular, semi-circular and the like.

The first filter unit 170 is mounted above the first cutting fluid bath 150. The filter unit 170 includes a filter element 172 formed for example of a mesh plate or a punching metal having plural pores. The first filter unit 170 performs a primary filtration of the cutting fluid.

The chips tend to cause clogging of the filter element. However, the present scraper unit is equipped with a means for preventing clogging of the filter element.

The scraper unit 250 is equipped with a cleaning member 280 fixed to the front surface of the scraper member 260 by a fixing member 284. The cleaning member 280 is formed for example of an abrasion-resistant plastic board.

When the cleaning member 280 travels along the lower surface of the filter element 172 of the filter unit 170, it contacts the filter element 172, removing any foreign material adhered to the filter element, and thereby recovers the function of the filter.

During the above movement, the strip-shaped chips being pushed by the scraper unit 250 function as a brush, and contact the surface of the filter element 172 promoting removal of foreign materials therefrom. A plural number of scraper units 250 with cleaning members 280 are mounted to the chains with appropriate intervals.

While being pushed up by the scraper unit 250 along the sloped portion 136 of the partition panel 130, the cutting fluid contained in the chips is separated from the chips by self-weight, and returned to the first cutting fluid bath 150. Along with the movement of the scraper unit 250, the chips separated of the cutting fluid drop from the end 138 of the partition panel 130, and exit from the discharge opening 118.

After conveying the chips, the scraper unit advances along the passage formed to the lower side of the partition plate 130 with the chains. The scraper units and the chains, having reached the second cutting fluid bath 160 defined by the partition panel and the housing, drive a second filter unit 300 positioned inside the second cutting fluid bath 160.

Further, the scraper units passing through the second cutting fluid bath 160 clean the chip powder and the like collecting in the bottom surface of the bath 160, and return the powder and the like via a curved portion 119 to the first cutting fluid bath 150.

As shown in FIG. 4, the cutting fluid within the first cutting fluid bath 150 is filtered when passing through the filter element 172 of the first filter unit 170. The filtered fluid enters a first filtering chamber 174. The cutting fluid $W_1$ in the first filtering chamber 174 travels through a passage 124 formed outside the side surface panel 120, and flows into the second cutting fluid bath 160.

A second filter unit 300 is equipped inside the second cutting fluid bath 160. The second filter unit 300 employs a drum-type filter, for example, and separates the foreign elements contained in the cutting fluid through a cylindrical filter element 310.

The cutting fluid $W_2$ filtered through the second filter unit 300 is stored in a tank 350 formed to the side of the housing.

The tank 350 is equipped with a pump and the like (not shown), which supplies the cutting fluid $W_2$, completely separated from solid elements, to necessary areas of the machine tool.

Figure 11:
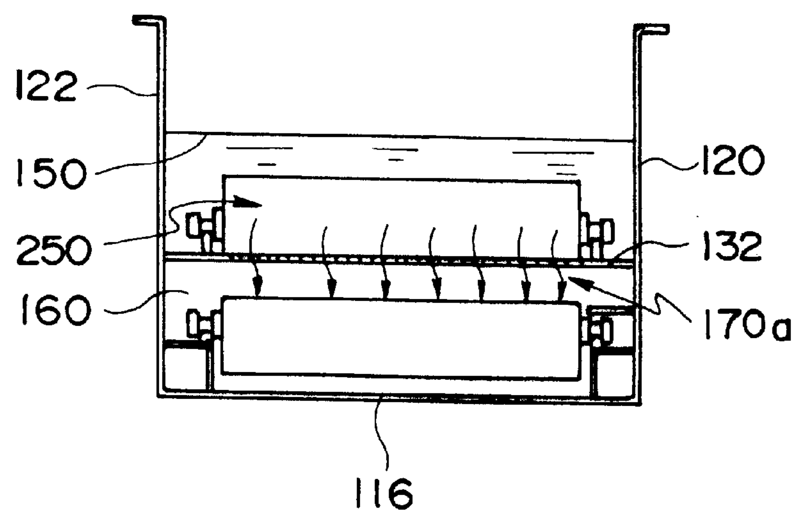
FIG. 11 is a C—C cross-sectional view of FIG. 1 showing another embodiment of the present invention.

FIG. 11 is a cross-sectional view taken along line C—C of FIG. 1, showing another embodiment of the present invention. According to the embodiment, a first filter unit 170*a* is mounted to the partition panel 132 separating the first cutting fluid bath 150 and the second cutting fluid bath 160.

The first filter unit 170*a* is equipped with a filter element formed of a punching metal, a wire gauze or the like, which is fixed to the opening portion of the partition panel 132. In another example, the first filter unit 170*a* may be formed by providing plural pores directly to the partition panel 132.

The height of the first filter unit may be reduced according to the present embodiment.

FIGS. 12 through 18 show another embodiment according to the present invention.

Figure 12:
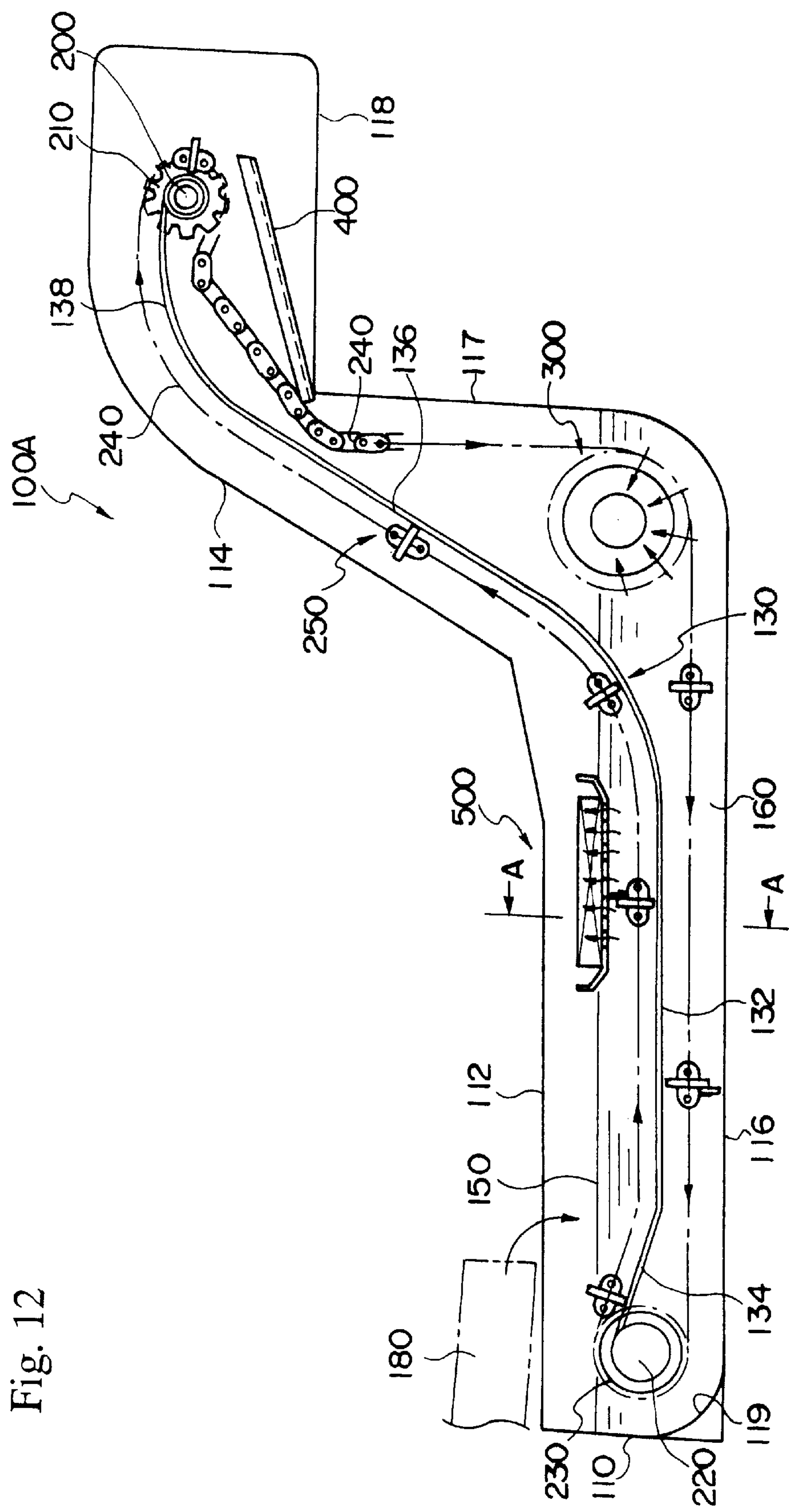
FIG. 12 is a cross-sectional side view showing yet another embodiment of the present invention.
Figure 13:
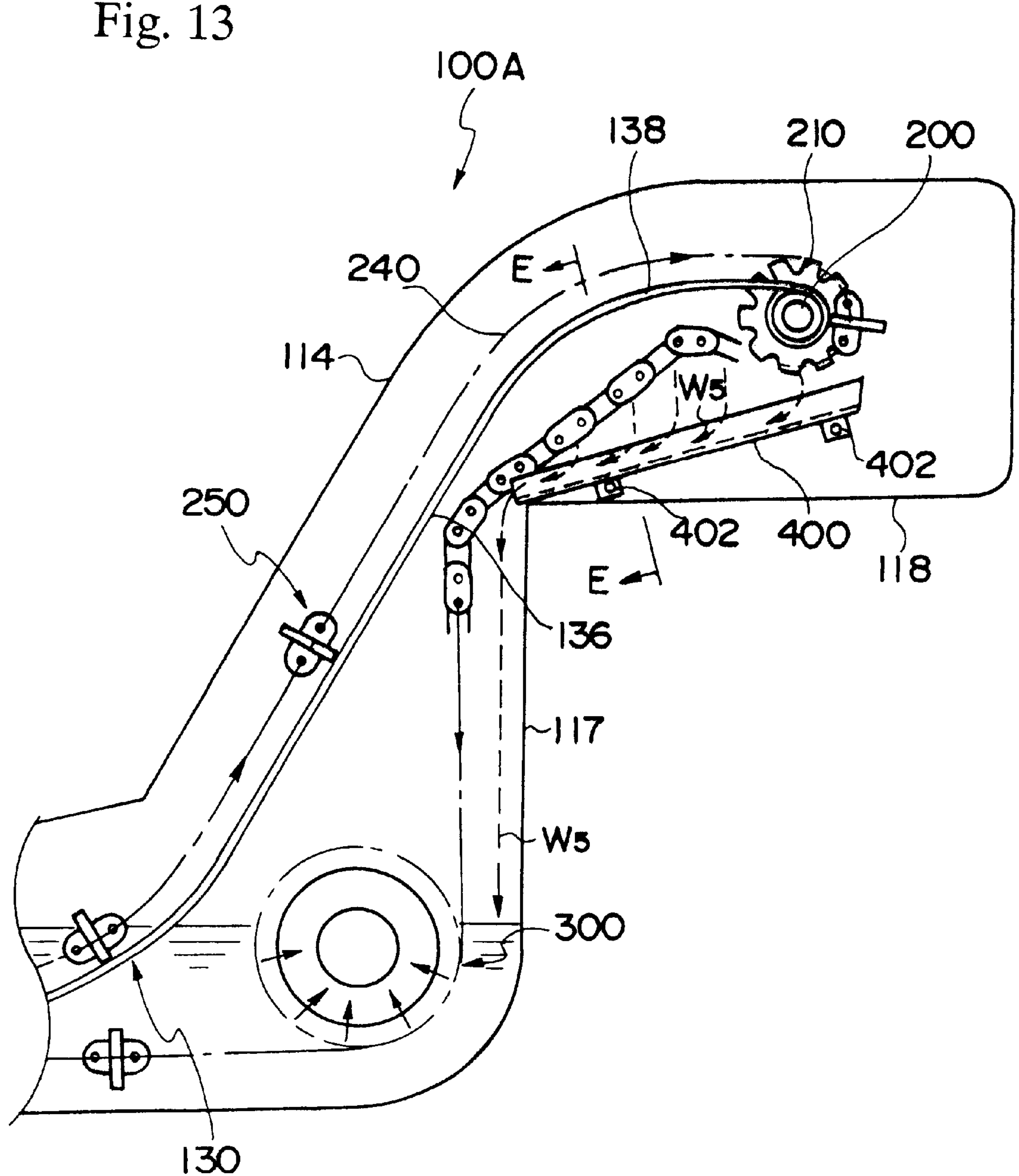
FIG. 13 is a cross-sectional side view showing the main portion of FIG. 2.
Figure 14:
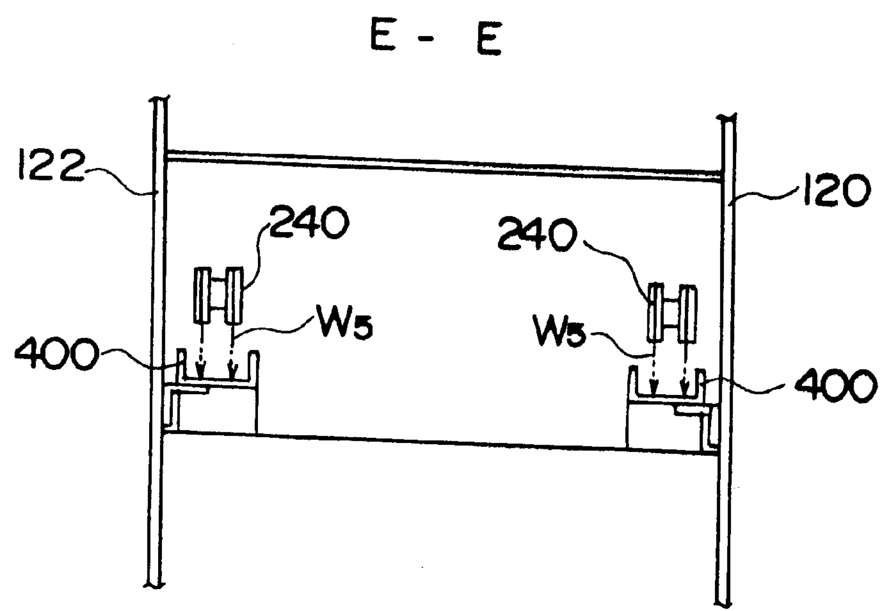
FIG. 14 is an E—E cross-sectional view of FIG. 13.

The chip treatment device 100A shown in FIG. 12 is similar to the device 100 shown in FIG. 1, except for the structure of a first filter unit 500 equipped to the first cutting fluid bath 150, and a fluid returning unit 400 for the chains mounted near the chip discharge opening and fixed through a mounting unit 402. The fluid returning unit returns fluid $W_5$ to the second cutting fluid bath 160. The same components are provided with the same reference numbers, and the detailed descriptions thereof are omitted.

Figure 15:
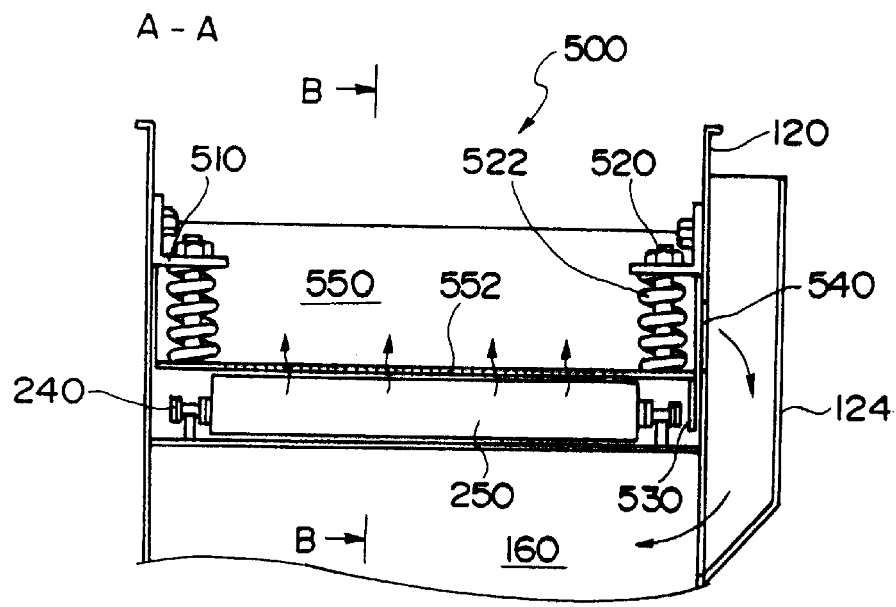
FIG. 15 is an A—A cross-sectional view of FIG. 12.
Figure 16:
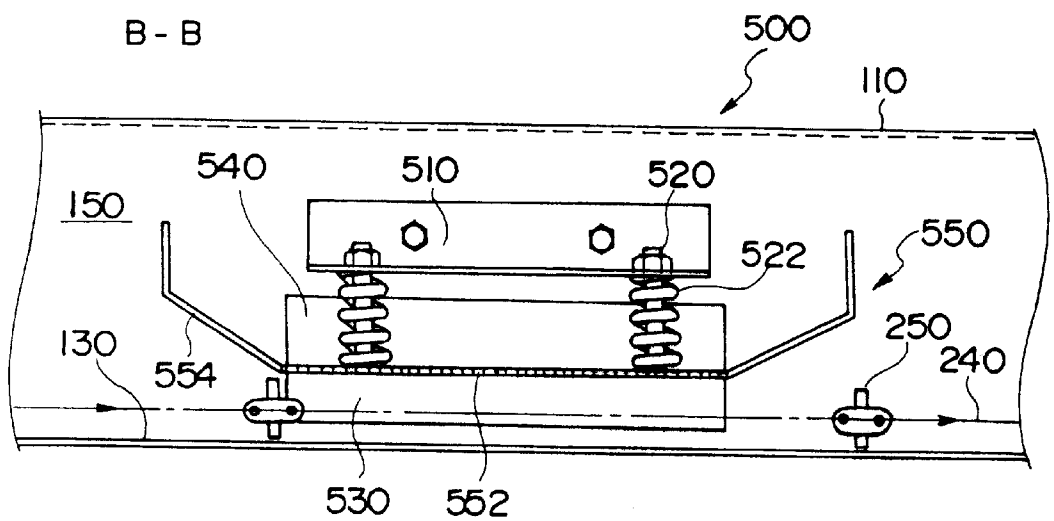
FIG. 16 is a B—B cross-sectional view of FIG. 15.

FIG. 15 is an A—A cross-sectional view of FIG. 12, and FIG. 16 is a B—B cross-sectional view of FIG. 15.

The first filter unit shown as a whole by reference number 500 comprises a housing 550 and bolts 520 for supporting both sides of the housing 550. Each bolt 520 is slidably supported by a bracket 510 fixed to the interior of each side surface 120 of the chip treatment device housing 110. Springs 522 are fit between the housing 550 and the brackets 510. The springs 522 pressurize the housing 550 toward the partition panel 130 constantly.

The housing 550 further comprises a filter element 552 mounted to the bottom surface thereof, and a sloped surface 554 formed toward the advancing direction of the chain.

The cutting fluid inside the first cutting fluid bath 150 travels upward through the filter element 552, passes through the opening 540, and flows into the passage 124 formed to the side surface of the housing 110. The fluid travels through the passage, and enters the second cutting fluid bath 160 formed to the lower area of the housing 110.

The side surface of the housing 550 opposing the opening 540 is equipped with a shielding plate 530, which is formed to shut the opening 540 corresponding to the vertical movement of the housing 550.

Figure 17:
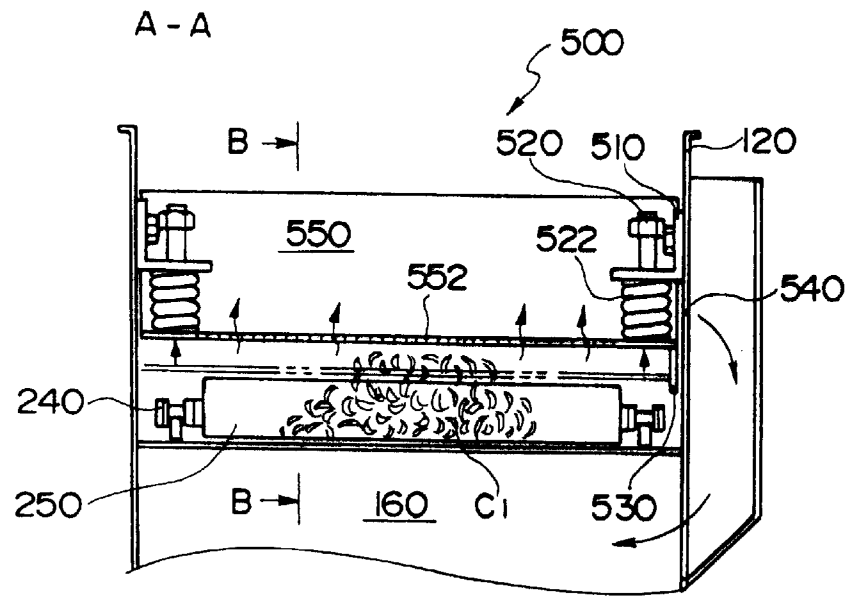
FIG. 17 is an A—A cross-sectional view of FIG. 12 showing the operation according to the present invention.
Figure 18:
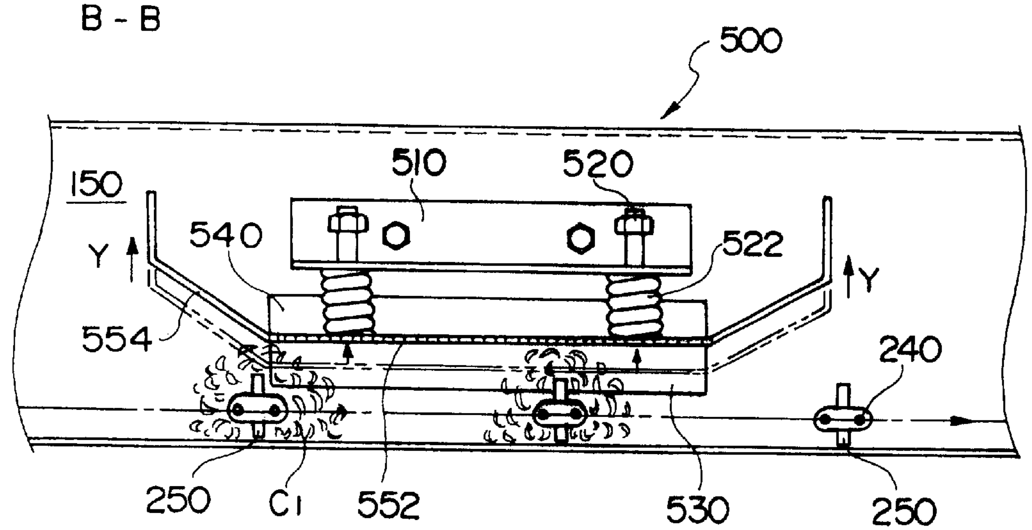
FIG. 18 is a B—B cross-sectional view of FIG. 17.
Figure 19:
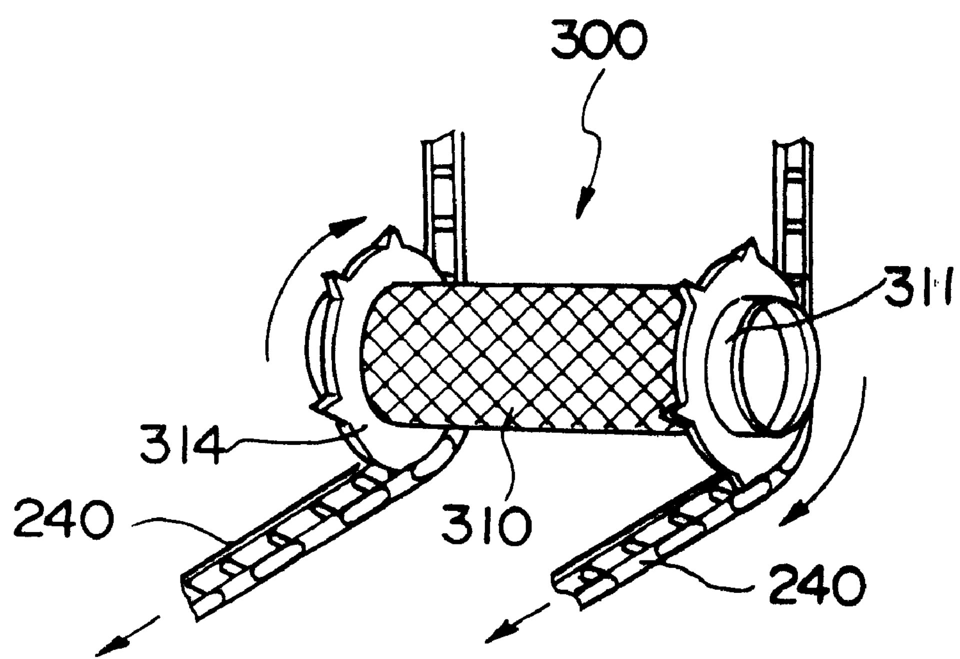
FIG. 19 is an explanatory view showing the structure of the rotary drum filter according to another embodiment of the present invention.
Figure 20:
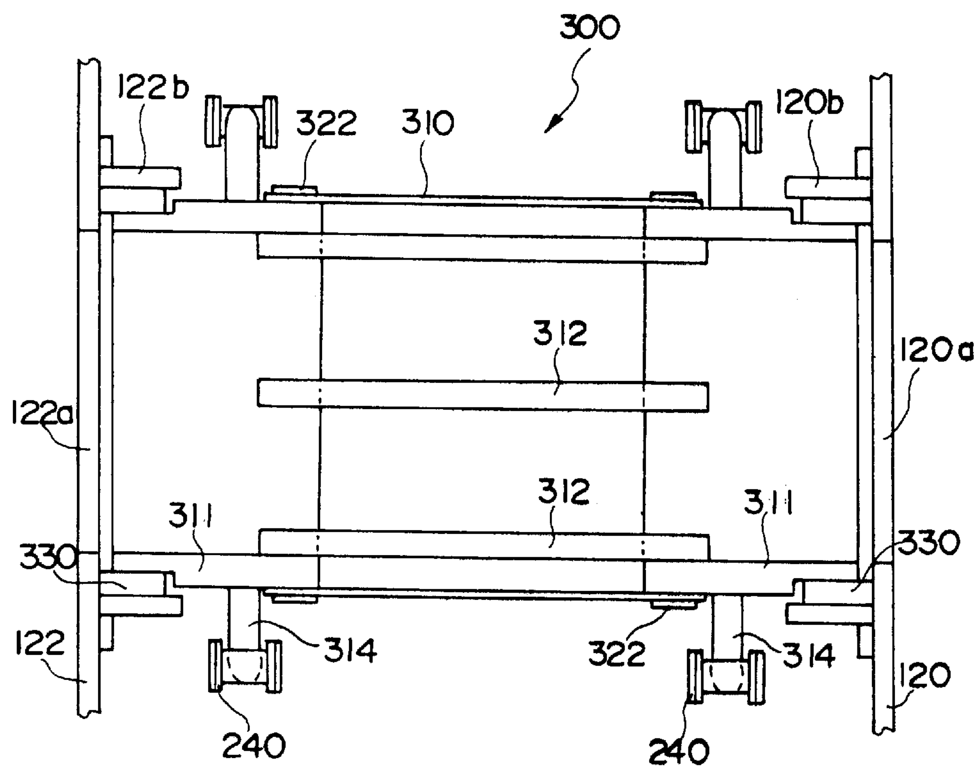
FIG. 20 is an explanatory view showing the structure of the rotary drum filter according to another embodiment of the present invention.
Figure 21:
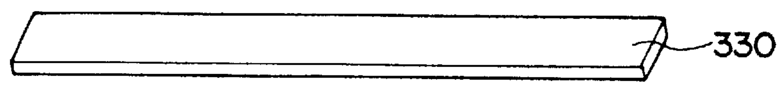
FIG. 21 is an explanatory view showing the bearing member of the rotary drum filter according to another embodiment of the present invention.
Figure 22:
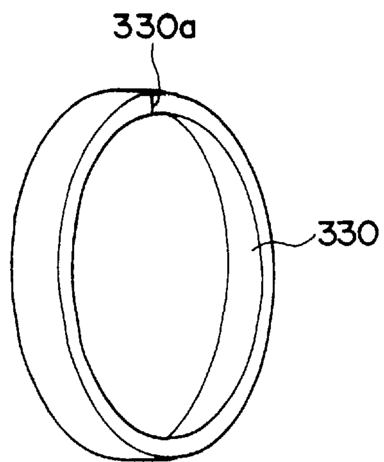
FIG. 22 is an explanatory view showing the bearing member of the rotary drum filter according to another embodiment of the present invention.

As shown in FIGS. 17 and 18, when the chain 240 advances and conveys the chips by the scraper units 250, the cutting fluid contained in the chips is filtered through the filter element 552 of the first filter unit, and is sent to the second cutting fluid bath 160.

When lumps of chips $C_1$ are conveyed by the scraper unit 250, the lumps $C_1$ contact the sloped surface 554 of the housing 550, and push up the housing 550 toward the arrow Y direction opposing to the force of the springs 522. By this movement, the scraper unit 250 is able to pass under the first filter unit 500 with the lump of chips $C_1$.

Along with the movement of the scraper unit 250, the lumps of chips $C_1$ slide against the filter element 552, and the chips act as a brush for cleaning the filter element. The clogging of the filter element 552 is thereby prevented.

Further, the cutting fluid $W_5$ adhered to the chains 240 and conveyed to the chip discharge opening falls on the gutter-like liquid returning unit 400, and returns to the second cutting fluid bath 160.

FIGS. 19 through 22 are explanatory views showing another embodiment of the chip treatment device according to the present invention.

The device includes an improved second filter 300.

The second filter unit 300 is a rotary-drum filter unit driven by the chains 240.

The filter unit 300 includes a pair of cylindrical boss members 311, and a shaft member 312 connects the boss members 311.

The shaft and the boss members are connected for example by welding means. A sprocket wheel 314 is formed to the outer circumference of each boss member 311. Each sprocket wheel 314 is engaged to a chain 240.

A filter element 310 is wound around the boss members 311, and fixed thereto by use of a fixing band 322 and the like.

Annular support members 120*b*, 122*b* are mounted to both side surface panels 120, 122 of the treatment device housing. Discharge openings 120*a*, 122*a* for discharging the cutting fluid is formed to the interior of the supporting members. The supporting members 120*b*, 122*b* are removably fixed to the side surface panels 120, 122 through bolt means and the like not shown.

A liner member 330 made of resin is used as a bearing for rotatably supporting the rotary filter.

The liner member 330 is produced by forming a board from super-macromolecular polyethylene, which has high elasticity and small friction coefficient. The board-shaped liner member 330 is rolled into a ring with both ends 330*a* fixed together, thereby forming the bearing.

The liner members or bearings 330 are each fit between the outer peripheral of the boss member 311 of the rotary filter and the inner circumference of the supporting members 120*b*, 122*b*. At this time, the liner members 330 may either be fixed to the support member, or may be intervened to position without being fixed.

Since the super-macromolecular polyethylene has small friction coefficient and high abrasion-resistance, and further has a sealing ability, it is preferable as a bearing member for a rotary filter.

According to the present embodiment, there is no need to use radial bearings for supporting the rotary filter, so the structure of the chip treatment device may be simplified, and the manufacturing cost of the device may be reduced.

Figure 23:
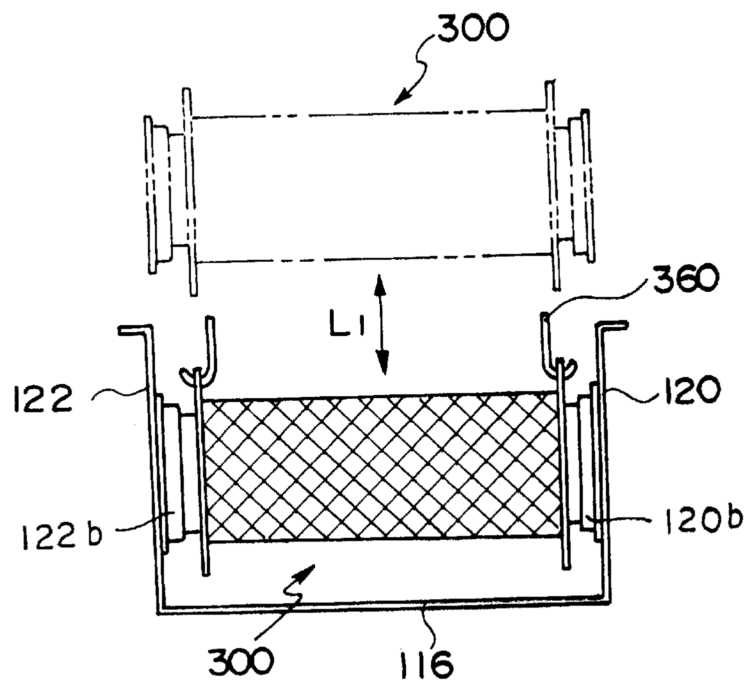
FIG. 23 is an explanatory view showing the removing tool for the rotary drum filter.
Figure 24:
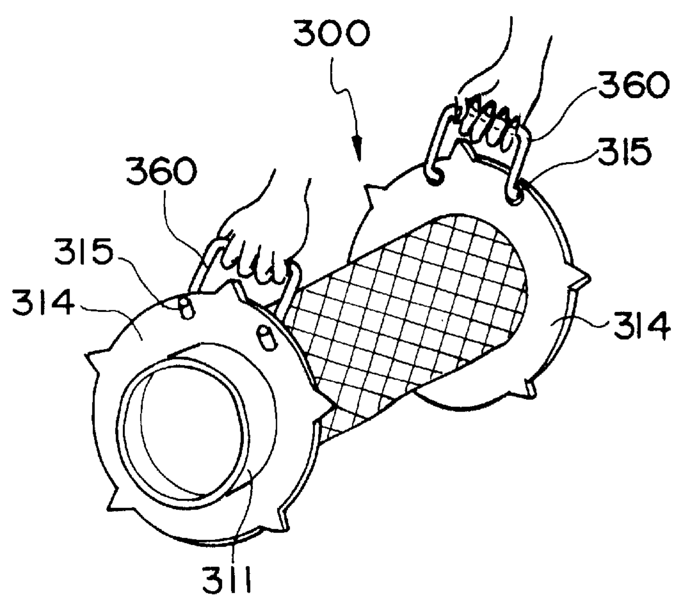
FIG. 24 is an explanatory view showing the removing tool for the rotary drum filter.
Figure 25:
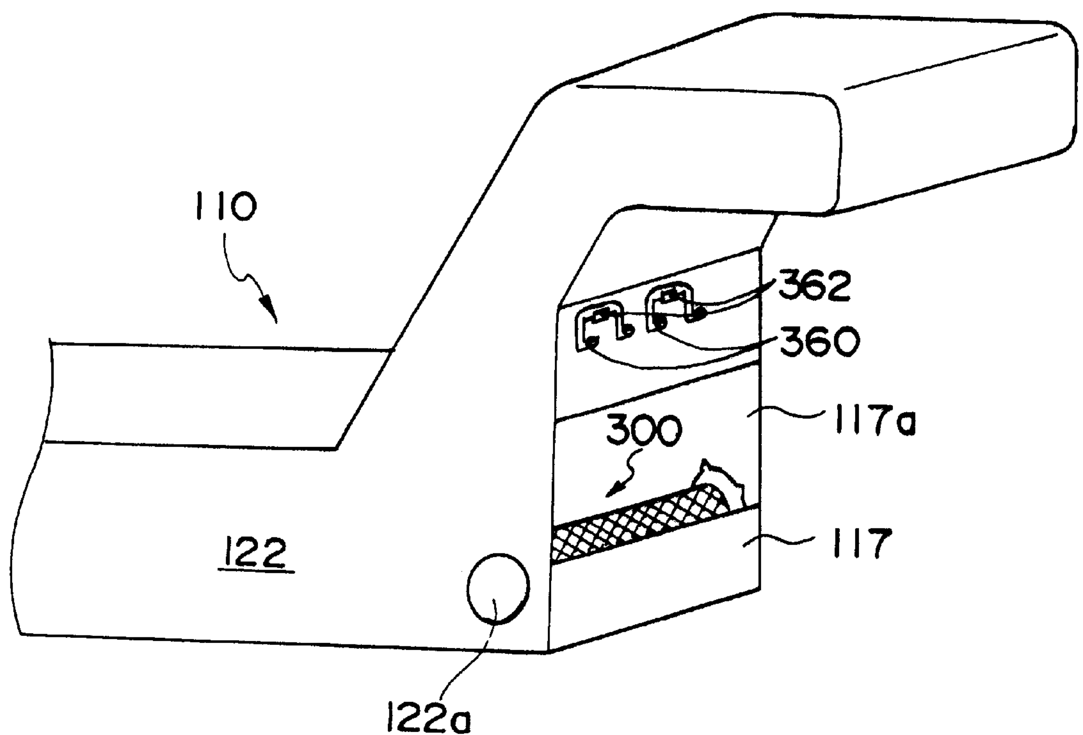
FIG. 25 is an explanatory view showing the removing tool for the rotary drum filter.
Figure 26:
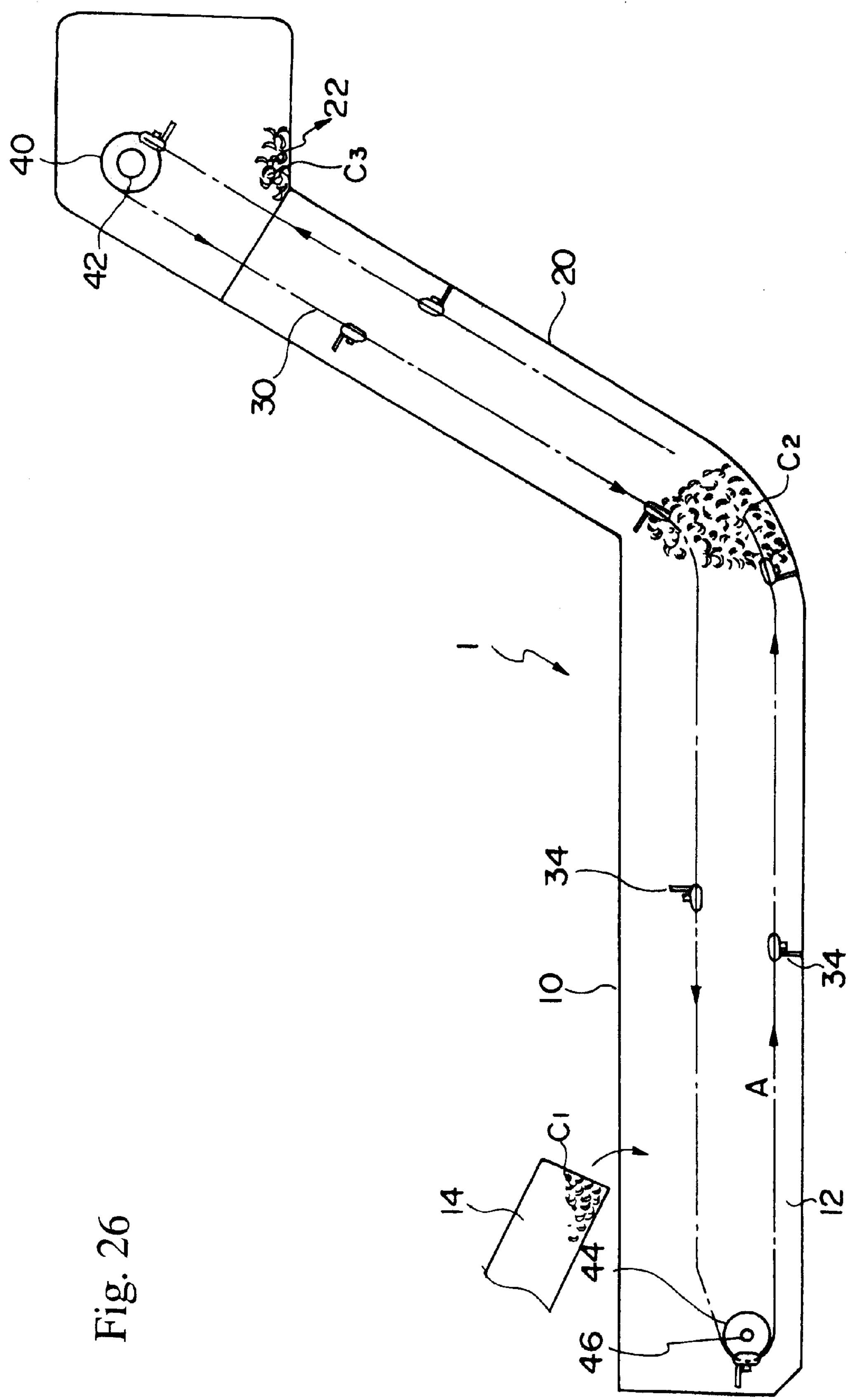
FIG. 26 is a cross-sectional side view of the chip treatment device according to the prior art.

FIGS. 23 through 25 are explanatory views of another embodiment of the chip treatment device according to the present invention. The rotary filter unit shown as a whole by reference number 300 must be removed from the device during assembly or maintenance of the chip treatment device.

The rotary filter unit 300 is difficult to handle, having a cylindrical shape with sprockets 314 mounted to both ends thereof.

Therefore, according to the present embodiment, holes 315 are formed to the sprocket 314, and a removing tool which may be engaged to the holes is prepared.

In order for the rotary filter unit 300 to be removed from the housing, a portion of the back panel 117 of the treatment device is removed to form an opening portion 117*a* thereto. Then, bolts and the like fixing the supporting members 120*b*, 122*b* of the rotary filter unit 300 are unfastened, and by use of the removing tool 360, the rotary filter unit 300 is removed from the housing.

The removing tool 360 may be stored to a hanger 362 formed to the back panel 117 of the housing when it is not used.

As explained, the present embodiment provides holes to the sprocket of the rotary filter unit and a removing tool stored in the housing that may be fit to the holes for removing the filter unit from the housing. According to the present embodiment, the efficiency of assembly or maintenance of the device is improved.

The chip treatment device according to the present invention provides many advantages. The scraper units traveling in the advancing direction are separated from those traveling in the returning direction by a partition wall, which prevents scraper units from crossing each other. Therefore, the collected chips may be conveyed smoothly despite their various shapes (curled or ball-shaped).

The first filter unit filters the cutting fluid flowing in from the bottom surface toward the upper direction. Therefore, the filter unit receives hardly any hydraulic pressure, and only the swarf suspending in the fluid is filtered by and adheres to the filter element. The chips conveyed by the scraper units constantly function as a new brush, wiping away the swarf adhered to the surface of the filter element, and preventing the clogging of filter.

Moreover, since a second filter unit is equipped to the second cutting fluid bath, secondary filtration may be performed within a single device.

The improved bearing structure of the second filter unit or rotary drum filter according to the present invention omits the need for a radial bearing, simplifies the structure of the device and lowers the manufacturing cost.

According to another aspect of the invention, the rotary drum filter may be removed by use of a removing tool, thus improving the efficiency of assembly or maintenance of the chip treatment device.

We claim:

1. A chip treatment device for treating chips discharged from a machine tool, comprising:

a box-shaped housing;

an entrance opening formed to one end of said housing for introducing said chips;

a discharge opening formed to the other end of said housing for discharging said chips;

driven chain guide units provided under said entrance opening;

driving sprockets equipped above said discharge opening for driving chains;

a pair of chains stretched between said driving sprockets and said driven chain guide units;

one or more scraper units mounted to said chains;

a partition panel extending between said driven chain guide units and said driving sprockets;

said partition panel having a first downwardly sloped portion and a second upwardly sloped portion defining;

a first cutting fluid bath formed above said partition panel; and a second cutting fluid bath formed under said partition panel;

wherein said scraper units convey said chips along the upper surface of said partition panel.

2. The chip treatment device according to claim 1, further comprising a first filter unit equipped within said first cutting fluid bath.

3. The chip treatment device according to claim 1, wherein a first filter unit is mounted above said first cutting fluid bath, and a filter element of said filter unit is cleaned by said scraper unit.

4. A chip treatment device for treating chips discharged from a machine tool, comprising:

a box-shaped housing;

an entrance opening formed to one end of said housing for introducing said chips;

a discharge opening formed to the other end of said housing for discharging said chips;

driven chain guide units provided under said entrance opening;

driving sprockets equipped above said discharge opening for driving chains;

a pair of chains stretched between said driving sprockets and said driven chain guide units;

one or more scraper units mounted to said chains;

a partition pane extending between said driven chain guide units and said driving sprockets;

said scraper units conveying said chips along the upper surface of said partition panel; and a first filter unit mounted above a first cutting fluid bath, and a filter element of said filter unit is cleaned by said scraper unit;

wherein said first filter unit is supported so as to be able to slide in the vertical direction to said partition panel, and further equipped with springs for pressing said first filter unit toward said partition panel.

5. The chip treatment device according to claim 1, wherein each of said scraper units is directly fixed to a link plate of said chains.

6. A chip treatment device for treating chips discharged from a machine tool, comprising:

a box-shaped housing;

an entrance opening formed to one end of said housing for introducing said chips;

a discharge opening formed to the other end of said housing for discharging said chips;

driven chain guide units provided under said entrance opening;

driving sprockets equipped above said discharge opening for driving chains;

a pair of chains stretched between said driving sprockets and said driven chain guide units;

one or more scraper units mounted to said chains;

a partition panel extending between said driven chain guide units and said driving sprockets;

said scraper units conveying said chips along the upper surface of said partition panel;

a first cutting fluid bath formed above said partition panel;

a second cutting fluid bath formed under said partition panel;

a first filter unit equipped within said first cutting fluid bath; and a passage for guiding the cutting fluid filtered by said first filter unit to said second cutting fluid bath, and a second filter unit provided within said second cutting fluid bath.

7. A chip treatment device, comprising a pair of chains each stretched between a driving sprocket and a driven chain guide unit;

one or more scraper units mounted to said chains;

a partition panel extending between said driven chain guide units and said driving sprockets;

a first cutting fluid bath formed above said partition panel; a second cutting fluid bath formed under said partition panel; and a filter unit provided within said second cutting fluid bath;

wherein said filter unit within said second cutting fluid bath is a rotary drum filter, having a filter element supported by a boss member, said filter unit rotatably supported within said second cutting fluid bath by liner members, made of super-macromolecular polyethylene, fitted about the outer periphery of said boss member.

8. The chip treatment device according to claim 7, wherein said filter unit includes sprocket wheels, and is driven by said chains.

9. The chip device according to claim 7, further equipped with a removing tool, readily engageable with said driving sprockets, used for removing said filter unit from said chip treatment device.

10. The chip treatment device according to claim 7, further equipped with a liquid returning unit, having the shape of a gutter and positioned beneath each chain, for receiving the cutting fluid dropping from said chains and returning said fluid to said second cutting fluid bath.

* * * * *